(12) United States Patent
Cook et al.

(10) Patent No.: US 8,118,058 B2
(45) Date of Patent: Feb. 21, 2012

(54) VARIABLE FREQUENCY AND AMPLITUDE DITHER FOR ELECTRONICALLY CONTROLLED VALVES

(75) Inventors: Daniel S. Cook, Terryville, CT (US); Roger Edwin Howe, New Canaan, CT (US)

(73) Assignee: Enfield Technologies, LLC, Trumbull, CT (US)

( * ) Notice: Subject to any disclaimer, the term of this patent is extended or adjusted under 35 U.S.C. 154(b) by 926 days.

(21) Appl. No.: 11/973,277

(22) Filed: Oct. 5, 2007

(65) Prior Publication Data

US 2008/0099706 A1 May 1, 2008

Related U.S. Application Data

(60) Provisional application No. 60/854,562, filed on Oct. 25, 2006.

(51) Int. Cl.
*F16K 31/02* (2006.01)
(52) U.S. Cl. ......... 137/625.64; 137/625.65; 251/129.04; 251/905; 323/282; 91/361
(58) Field of Classification Search .............. 251/129.04, 251/129.01, 905; 137/624.65, 625.65; 91/361; 323/282–285; 361/91
See application file for complete search history.

(56) References Cited

U.S. PATENT DOCUMENTS

| | | | | |
|---|---|---|---|---|
| 3,017,863 A | * | 1/1962 | Ulman et al. ................ | 91/363 R |
| 3,525,017 A | * | 8/1970 | Bohaker et al. ................ | 361/239 |
| 3,596,643 A | * | 8/1971 | Schweitzer .............. | 123/406.23 |
| 4,378,773 A | * | 4/1983 | Ohgami ........................ | 123/694 |
| 4,994,981 A | * | 2/1991 | Walker et al. ................ | 323/207 |
| 5,079,498 A | * | 1/1992 | Cleasby et al. .............. | 323/283 |
| 5,638,863 A | * | 6/1997 | Whang et al. ............ | 137/624.11 |
| 5,883,536 A | * | 3/1999 | Patterson ...................... | 327/184 |
| 5,960,831 A | | 10/1999 | Borcea et al. ............ | 137/625.65 |
| 6,155,654 A | * | 12/2000 | Oyama .................... | 251/129.15 |
| 6,317,458 B1 | * | 11/2001 | Boggs et al. ................. | 323/276 |
| 6,938,592 B2 | * | 9/2005 | Taylor et al. ............... | 123/90.15 |
| 7,209,321 B1 | | 4/2007 | Bennett ........................ | 360/108 |
| 2005/0241602 A1 | * | 11/2005 | Jiang .......................... | 123/90.17 |
| 2006/0011878 A1 | * | 1/2006 | Denyer et al. ............ | 251/129.08 |

OTHER PUBLICATIONS

Data sheet SLOS401A, Sep. 2002 (revised Oct. 2002) for the DRV593/DRV594 from Texas Instruments, and subtitled "±3-A High-Efficiency PWM Power Driver", 23 pages.
Data sheet SBOs120, entitled "INA-145" and subtitled "Programmable Gain Difference Amplifier" (Mar. 2000 printing date), from Burr-Brown, Tucson, AZ, 13 pages.
Data Sheet DS39598E, entitled "PIC16F818/819 Data Sheet" and subtitled "18/20-Pin Enhanced Flash Microcontrollers with nano Watt Technology" (2004), from Microchip.
Data sheet 29319.37H, entitled "3959" and subtitled DMOS Full-Bridge PWM Motor Driver (no date given), from Allegro Microsystems, Inc., Worcester, MA., 12 pages.
Data Sheet SBOS105, entitled "INA157" and subtitled "High-Speed, Precision Difference Amplifier", (Mar. 1999 printing date), from Burr-Brown, Tucson, AZ, 10 pages.
26/2000 Series, "High Pressure Reducing Up to 15,000 PSIG in/up to 10,000 PSIG out spring loaded/dome loaded/air actuated", revised Apr. 2004, Tescom Corporation, Elk River, MN 55330, USA, 4 pages.

* cited by examiner

*Primary Examiner* — John Bastianelli
(74) *Attorney, Agent, or Firm* — Harrington & Smith (57) ABSTRACT

A method is disclosed that includes allowing both frequency and amplitude of a periodic waveform to be adjusted. The method also includes creating the periodic waveform having the frequency and the amplitude. The periodic waveform is coupled to at least one control signal. The at least one control signal is provided to an output suitable for coupling to an actuator of an electronically controlled device. An apparatus and computer program product are disclosed.

20 Claims, 12 Drawing Sheets

VARIABLE FREQUENCY AND AMPLITUDE DITHER FOR ELECTRONICALLY CONTROLLED VALVES

CROSS-REFERENCE TO RELATED APPLICATIONS

The present application claims the benefit under 35 U.S.C. §119(e) of U.S. Provisional Patent Application No. 60/854,562, filed on 25 Oct. 2006, the disclosure of which is hereby incorporated by reference in its entirety.

TECHNICAL FIELD

This invention relates generally to control systems and, more specifically, relates to controllers and systems using electronically controlled valves, electronically controlled valves, and portions thereof.

BACKGROUND

Control systems for electronically controlled valves control many different types of fluids for many different purposes. While control systems, their controllers, and the associated electronically controlled valves have many benefits, these control systems, controllers, electronically controlled valves and portions thereof may still be improved.

For instance, certain electronically controlled valves have a spool that is disposed within a valve body of the valves. The spool is configured to valve fluid between the inlet and outlet of the valves. With many of these valves, there is a "stiction" that occurs when the valve is placed in a single position for some time period. Such stiction can cause, for instance, a lack of response initially to an increase in control signals applied to an electronic actuator of the valve. In other words, the spool becomes "stuck" and lacks initial responsiveness. Increasing the value of the control signal will cause the spool to become unstuck, but a lack of fine control results. To reduce stiction, mechanical dither is used, where the spool itself is made to vibrate. The vibration reduces or eliminates stiction. However, systems for creating mechanical dither could be improved.

BRIEF SUMMARY

In an exemplary embodiment of this invention, a method is disclosed that includes allowing both frequency and amplitude of a periodic waveform to be adjusted. The method also includes creating the periodic waveform having the frequency and the amplitude. The periodic waveform is coupled to at least one control signal. The at least one control signal is provided to an output suitable for coupling to an actuator of an electronically controlled device.

In a further exemplary embodiment, an apparatus is disclosed that includes electronic dither circuitry configured to create a periodic waveform having a frequency and amplitude. The electronic dither circuitry is further configured to allow both the frequency and the amplitude to be adjusted. The apparatus also includes coupling circuitry configured to couple the periodic waveform to at least one control signal, and includes an output suitable for coupling the at least one control signal to an actuator of an electronically controlled device.

In another exemplary embodiment of this invention, a computer program product comprising program instructions embodied on a tangible computer-readable medium is disclosed. The instructions include allowing both frequency and amplitude of a periodic waveform to be adjusted. The instructions also include creating the periodic waveform having the frequency and the amplitude. The periodic waveform is coupled to at least one control signal. The at least one control signal is provided to an output suitable for coupling to an actuator of an electronically controlled device.

BRIEF DESCRIPTION OF THE DRAWINGS

The attached Drawing Figures include the following.

DETAILED DESCRIPTION OF EXEMPLARY EMBODIMENTS

Figure 1:
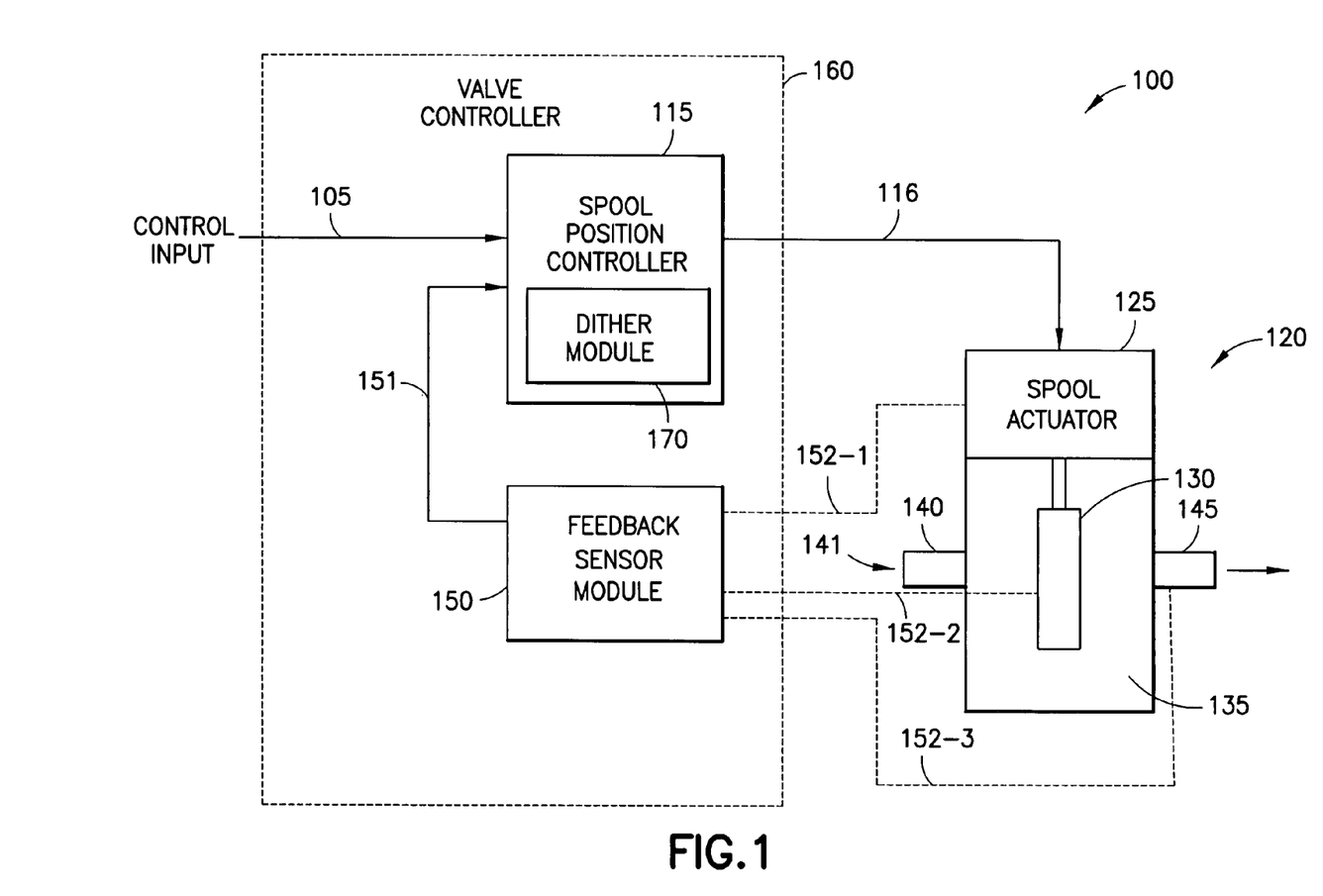
FIG. 1 is a block diagram of a system including a portion for controlling an electronically controlled valve and the electronically controlled valve.

Referring now to FIG. 1, a block diagram is shown of an exemplary system 100 having a portion for controlling an electronically controlled valve 120. System 100 also includes in this example the electronically controlled valve 120. FIG. 1 is a simplistic, high-level view of a system 100 that includes a control input 105, a spool position controller 115, the electronically controlled valve 120, and a feedback sensor module 150 that takes an input from one or more feedback sensors (not shown) and that produces one or more feedback signals 151. A valve controller 160 includes the spool position controller 115, and the feedback sensor module 150. The electronically controlled valve 120 includes a spool actuator 125, such as a voice coil, a spool 130, a body 135, an input 140, and an output 145. The spool position controller 115 includes a dither module 170, which adds electronic dither to the one or more control signals 116.

The electronically controlled valve 120 controls fluid (e.g., air, gas, water, oil) 141 flow through the electronically controlled valve 120 by operating the spool 130. The spool actuator 125 controls movement of the spool 130 based on one or more control signals 116 from the spool position controller 115. The spool position controller 115 modifies the one or more control signals 116 based on the control input signal 105 and the one or more feedback signals 151. The feedback sensor module 150 can monitor the spool actuator 120 (e.g., current through the spool actuator) through a sensor signal 152-1, a sensor indicating the position of the spool 130 (through a sensor signal 152-2), or sensors indicating any number of other valve attributes (e.g., pressure or flow rate of the fluid 141) through other sensor signals 152 such as sensor signal 152-3.

Figure 2:
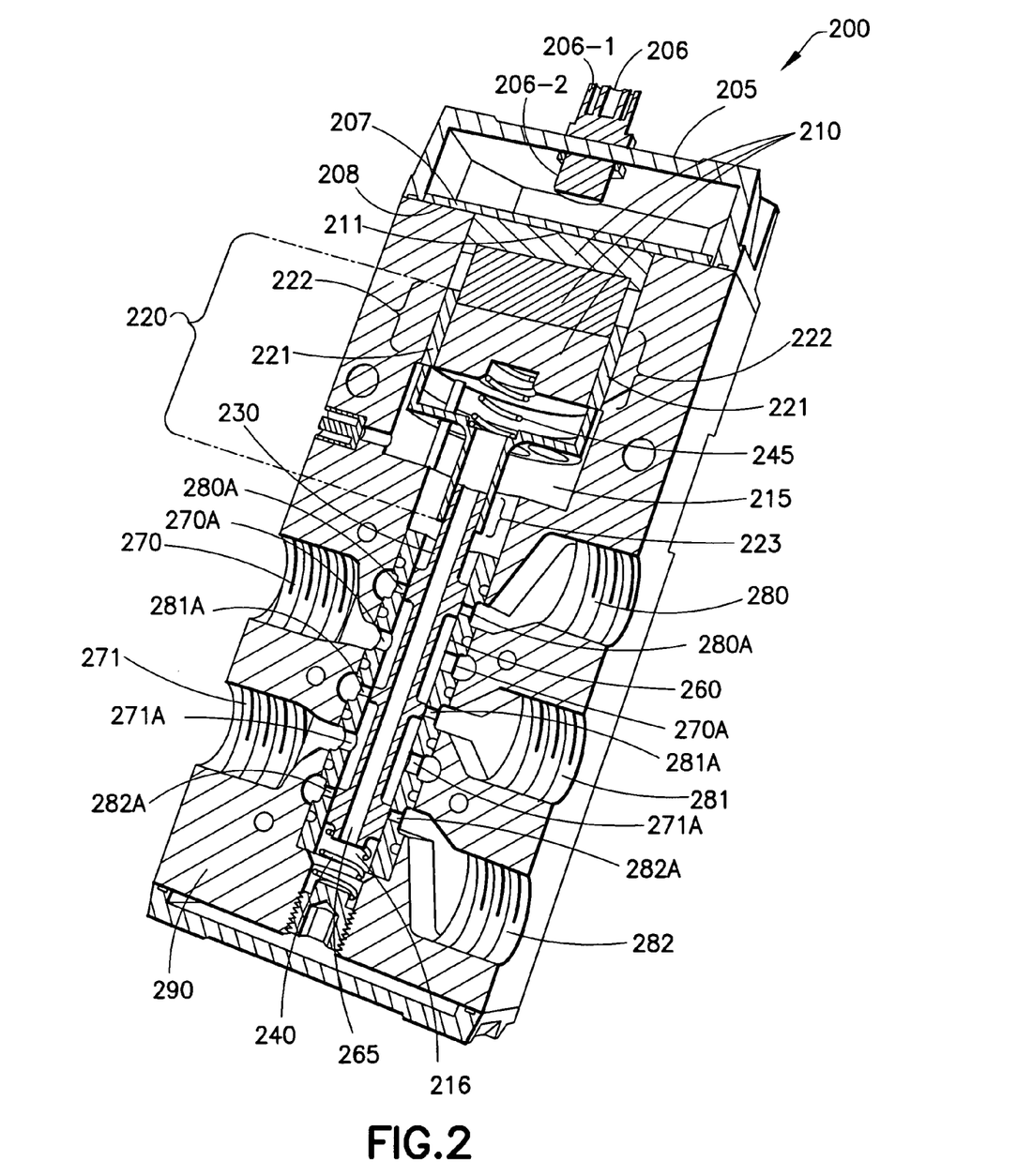
FIG. 2 is a cutaway, perspective view of an exemplary pneumatic valve.
Figure 9:
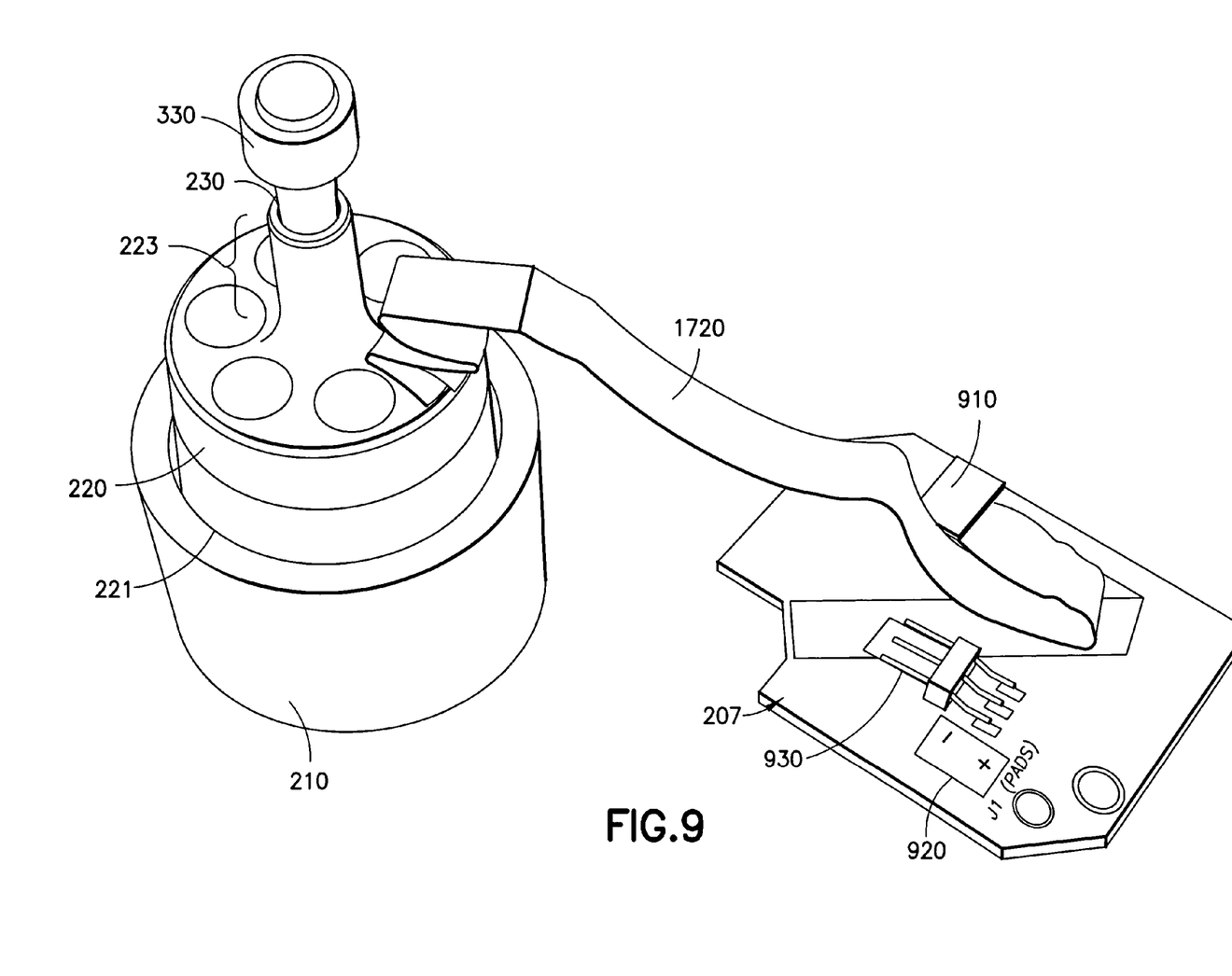
FIG. 9 is a view of the motor housing retainer coupled to the motor housing and also of the coil header assembly and spool.

Turning to FIG. 2 in addition to FIG. 1, a cutaway, perspective view is shown of an exemplary pneumatic valve 200. The pneumatic valve 200 includes an electronics cover 205, a motor housing retainer 207, a motor housing 210, an upper cavity 215, a lower cavity 216, a coil header assembly 220, a spool 230, a sleeve 260, a lower spring 240, an upper spring 245, external ports 270, 271, 280, 281, and 282, circumferentially spaced internal ports 270a, 271a, 280a, 281a, and 282a, and a valve body 290. Coil header assembly 220 includes a voice coil portion 222 having a voice coil 221 and an overlap portion that overlaps a portion of the spool 230 and connects the spool 230 to the coil header assembly 220. The spool actuator 125 of FIG. 1 includes, in the example of FIG. 2, motor housing 210, coil header assembly 220, upper spring 245, and lower spring 240. It is noted that a view of the motor housing 210 is also shown in FIG. 9 and that at least a portion of the motor housing 210 is magnetized in order to be responsive to the voice coil 221.

In this example, a top surface 211 of the motor housing 210 contacts a bottom surface 208 of motor housing retainer 207. The motor housing 210 is therefore held in place by the motor housing retainer 207, and the motor housing retainer 207 is a printed circuit board. The motor housing retainer 207 serves multiple purposes, as is disclosed in more detail in U.S. patent application Ser. No. 11/903,132 filed on Sep. 19, 2007 and assigned to the assignee of the present application.

The spool 230 includes in this example a passage 265. The passage 265 has a number of purposes, including equalizing pressure between the upper cavity 215 and the lower cavity 216, as described in more detail below. The passage 230 is included in an exemplary embodiment herein, but the spool 230 may also be manufactured without passage 265 (see, e.g., FIG. 3).

As also described below, the electronics cover 205 includes a connector 206 used to couple a spool position controller 115 to the voice coil 221 on voice coil portion 222. The electronics cover 205 is one example of a cover used herein. The top section 206-1 of connector 206 would be connected to the control signal(s) 116, in this example using coaxial cable (not shown) and appropriate connectors. The bottom section 206-2 of connector 206 is suitable for coupling to the motor housing retainer 207, which is then coupled to voice coil 221 as described below in reference to FIG. 9.

A description of exemplary operation of the valve 200 is included in U.S. Pat. No. 5,960,831, the disclosure of which is hereby incorporated by reference in its entirety. U.S. Pat. No. 5,960,831 describes, for instance, airflow through the external ports 270, 271, 280, 281, and 283 and the circumferentially spaced internal ports 270a, 271a, 280a, 281a, and 283a. It is noted that the springs 240, 245 along with the coil header assembly 220, motor housing 210, and spool 230, are configured such that the spool 230 blocks the ports 281A when no power is applied to the voice coil 221. Other portions of pneumatic valve 200 are also described in U.S. Pat. No. 5,960,831.

Figure 3:
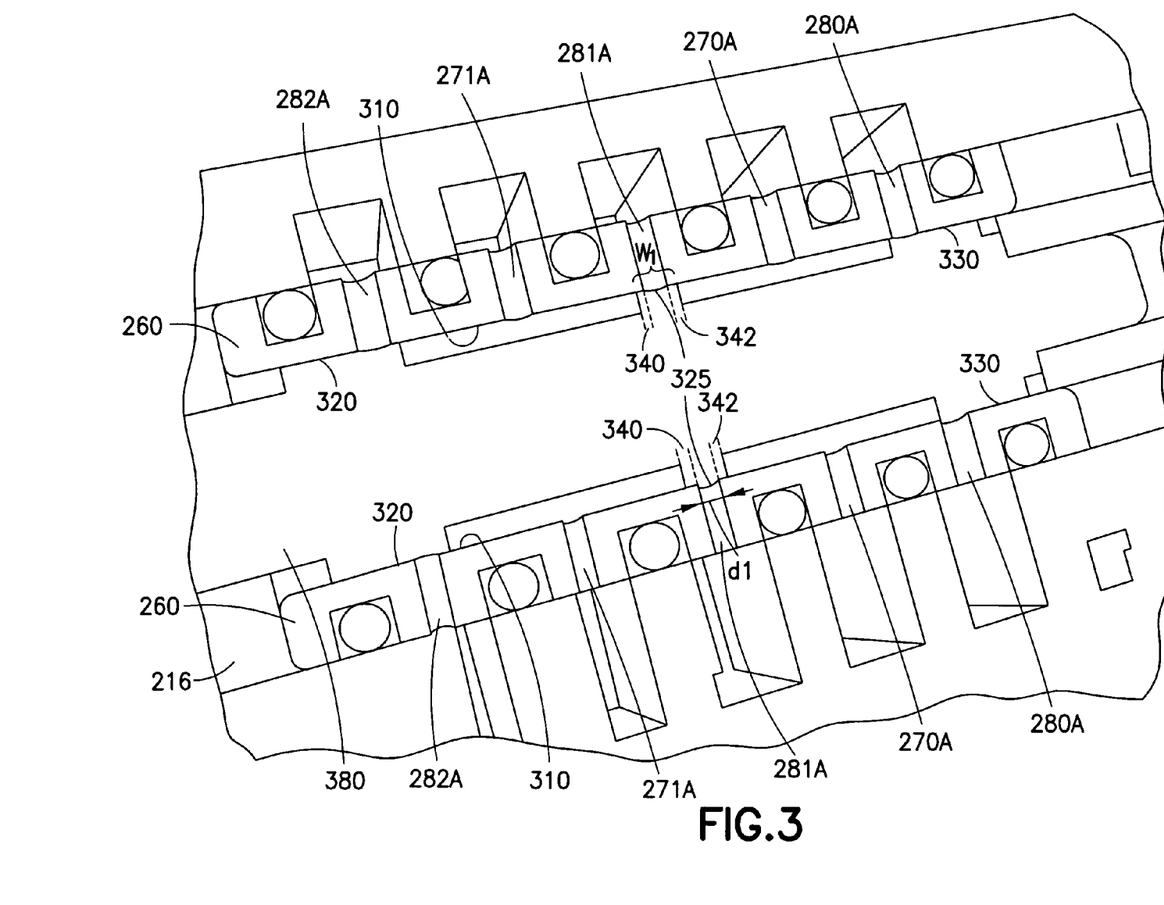
FIG. 3 is a cutaway view of a valve body of the pneumatic valve of FIG. 2, showing spool and sleeve overlap at zero position (spring return to center, coil current=zero)

Turning to FIG. 3 in addition to FIG. 2, in the example of FIG. 3, a portion of the pneumatic valve 200 of FIG. 2 is shown wherein the spool 230 of FIG. 2 is solid and shown as spool 380. The spool 380 of FIG. 3 has several 'lands' 320, 325, and 330 that block airflow from the ports 282A, 271A, 281A, 270A, and 280A (collectively, "ports" herein) in the sleeve 260. The spool 380 (and typically spool 230 of FIG. 2) is assumed to be centered with no current flowing through the voice coil 221 (i.e., spring return to center). To minimize fluid (e.g., air) leakage due to the miniature gaps between the lands 320, 325, and 330 and the inner surface 310 of the sleeve 260, the lands 320, 325, and 330 of the spool are machined to be slightly wider when the valve is in the closed/off position than the diameter of the ports. A common design approach in order to minimize leakage is therefore to widen the spool land width (e.g., $W_1$) wider than the diameter (e.g., $d_1$) of a port. This effort serves to effectively increase flow restriction (and therefore decrease leakage) by providing a smaller effective cross-sectional area to length aspect ratio. The land 325 (for instance) therefore has an overlap including portions 340 and 342 relative to the diameter of the port 281A. This construction limits air leakage, but creates a natural 'dead band' where small spool displacements will cause no change in aperture size (therefore, small spool displacements will result in no change in air flow). Since less leakage is more desirable, it seems more desirable to have a wider land width. However, a wider land width introduces inaccuracies because of the dead band when trying to converge in the final control system.

Minimization of leakage may also be accomplished by minimizing the mechanical clearance between the lands 320, 325, and 300 of the spool 230 and the inner surface 310 of the sleeve 260. The upper bound for minimizing clearance is mechanical friction and manufacturability, and minimizing clearance causes increased manufacturing costs.

There will always be a desire to increase the spool land width (and therefore increase the dead band) to decrease leakage or to maintain leakage as the spool/sleeve fit is more loose (and therefore, easier and less costly to manufacture). However, as described above, increasing the land width also increases the dead band, leading to less effective control over the fluid and more inaccuracies. On the other hand, minimizing clearance increases manufacturing costs and can increase friction (and therefore, increase stiction). Therefore, both of these techniques have problems.

FIG. 9 is a view of an example of the motor housing retainer 207 coupled to the motor housing 210 and also of the coil header assembly 220 and spool 230. The motor housing 210 may be made from steel (or other magnetically permeable material) and houses the coil armature assembly 220, a magnet, and a pole. The motor housing, magnet, and pole make up the motor assembly which creates a static magnetic field. The armature assembly includes the coil 221, the header, and the conducting wire or cables 1720. The armature assembly moves axially with respect to the motor assembly. The conducting cable 1720 can be discrete wires or flexible printed circuit (FPC) or some other flexible conducting medium (as shown here).

The motor housing retainer 207 is coupled to the voice coil 221 using the cable 1720. The FPC connector 910 is used to couple the cable 1720 to the motor housing retainer 207. The J1 connection 920 (pads in this example but could also be a connector similar to connector 910) may be used to couple the motor housing retainer 207, and therefore the connector 910, to the bottom section 206-2 of the connector 206. Alternatively pin header 920 may be used to couple the motor housing retainer 207 to the bottom section 206-2 of the connector 206.

The voice coil driven pneumatic valve 200 of FIG. 2 (e.g., as well as other manufacturer's solenoid and voice coil driven hydraulic and pneumatic valves) is an electromechanical system. As such, these systems are typically embodied as an electromagnetic actuator (e.g., spool actuator 125) directly coupled to a valve element (e.g., spools 230 and 380 of FIGS. 2 and 3, respectively) that slides within a sleeve element (e.g., sleeve 260 of FIGS. 2 and 3). This sliding action inherently exhibits many different forms of friction, such as viscous friction and static/dynamic friction also called "stiction". It is the 'stiction friction' that causes the difficulties in pneumatic systems that require high levels of accuracy (e.g., goal convergence).

A common approach to conquering stiction in mechanical systems is to incorporate electronic dither of the command signal such as control signal(s) 116. This electronic dither serves the purpose of keeping the valve element (e.g., spools 230 and 380 of FIGS. 2 and 3, respectively) in a state of constant motion (called mechanical dither) to eliminate relatively long periods of zero velocity, which is a characteristic that may lead to stiction. Electronic dither is typically introduced, as any number of variations of signal profiles, in the output stage driver. Typically, sinusoidal, square-wave, or triangular waveforms is the signal profile. If the dither frequency is high enough with respect to the bandwidth of the mechanical element, any arbitrary waveform will be realized as approximately sinusoidal mechanical motion of small amplitude.

Figure 4:
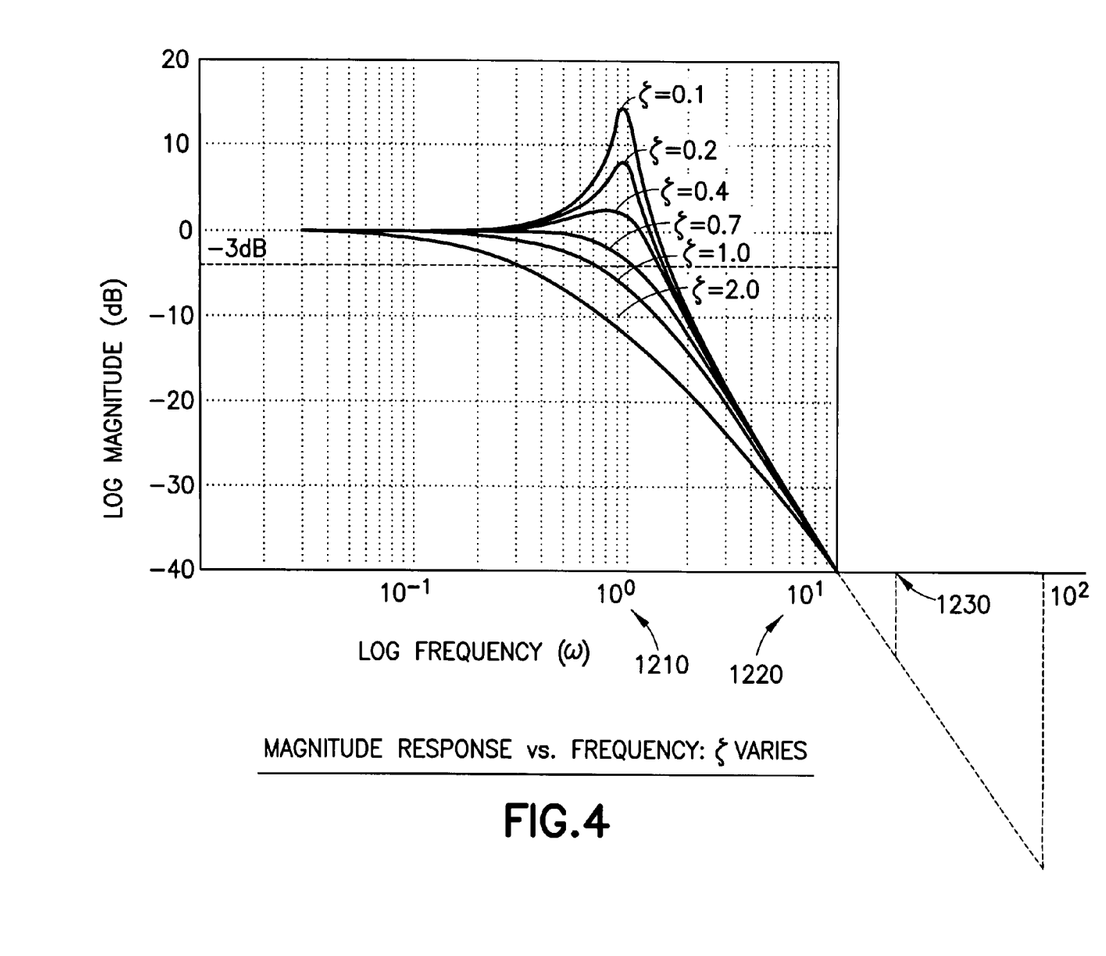
FIG. 4 is a graph of magnitude response versus frequency as zeta ($\zeta$) varies for a typical second-order system.

The stiction problem is addressed in an exemplary embodiment herein by using a conventional solution in an unconventional way. FIG. 4 shows representative plots of the magnitude response of a typical second order system, where a second-order system is similar to a voice coil driven pneumatic valve response.

The plots in FIG. 4 show the amplitude of a typical (e.g., normalized) second-order system at various values of zeta ($\zeta$). In terms of the system 100 shown in FIG. 1, the log-magnitude can be considered to represent amplitude of movement of the spool 130 in response to a frequency of movement of the spool 130. Such amplitude movement and frequency of movement of the spool 130 are mechanical dither of the spool. Movement of the spool is caused at least in part by electronic dither applied to the control signal(s) 116 by the spool position controller 115. Consequently, there is a relationship between electronic dither in the control signal and corresponding mechanical dither of the spool.

In the example given below, zeta is equal to 0.4. As frequency of mechanical dither increases above the peak amplitude, it is clear that the amplitude of the oscillations will decrease. The peak amplitude occurs at approximately 1 rad/s. For lower frequencies of mechanical dither, the amplitude will be relatively constant, but will respond based on the dynamics of the particular system being excited.

Using this technique, one can change the amplitude of oscillation while changing the frequency of oscillation, which can provide additional benefit beyond that attainable from variable amplitude mechanical dither alone. For instance, if the particular valve being controlled has a frequency-dependant stiction component that is minimized at a particular frequency, then modification of the frequency in conjunction with modification of the amplitude of the control signal provides benefits not found by simple modification of only the amplitude. Additionally, the system in which the valve is being used may also be sensitive to a particular frequency. Therefore, this adaptation (i.e., modification of frequency in addition to amplitude of the control signal) would allow users to excite the valve (e.g., excite a voice coil of the valve) with a slightly different frequency while retaining the advantages of mechanical dither. As shown in FIG. 4, increasing the frequency at which mechanical dither occurs also causes a decrease in amplitude of the valve (e.g., spool 230/380) motion; decreasing the frequency at which dither occurs increases the amplitude of the valve (e.g., spool 230/380) motion.

Since the control signal (and electronic dither placed thereon) will ultimately excite the valve voice coil, a change in the control signal will change the mechanical motion of the spool. However, a mechanical element, including the spool, is more sensitive to certain frequency ranges and signal shapes, so excitation with components of a high enough frequency can resolve as nearly sinusoidal motion. Nonetheless, non-sinusoidal motion in a signal shape is possible if the exciting frequency component is low enough.

It is noted that reference 1210 on FIG. 4 corresponds to a frequency of electronic dither of around 100 Hz; reference 1220 corresponds to around 1 (one) kHz; and reference 1230 corresponds to around 2 kHz. Two kilohertz is a frequency that is commonly used for electronic dither. The slope of the curve beyond the −3 dB frequency is approximately −20 dB/decade.

Variable amplitude dither is rather straight-forward; as the dither signal amplitude is changed, the mechanical oscillations (e.g., of the spool 230/380) change, and the change is directly related to the change in amplitude. What is beneficial herein is the combination of variable amplitude and variable frequency (where a variation in frequency causes a corresponding variation in amplitude) dither in a single valve management circuit to allow optimization of the dither.

Figures 5, 5B:
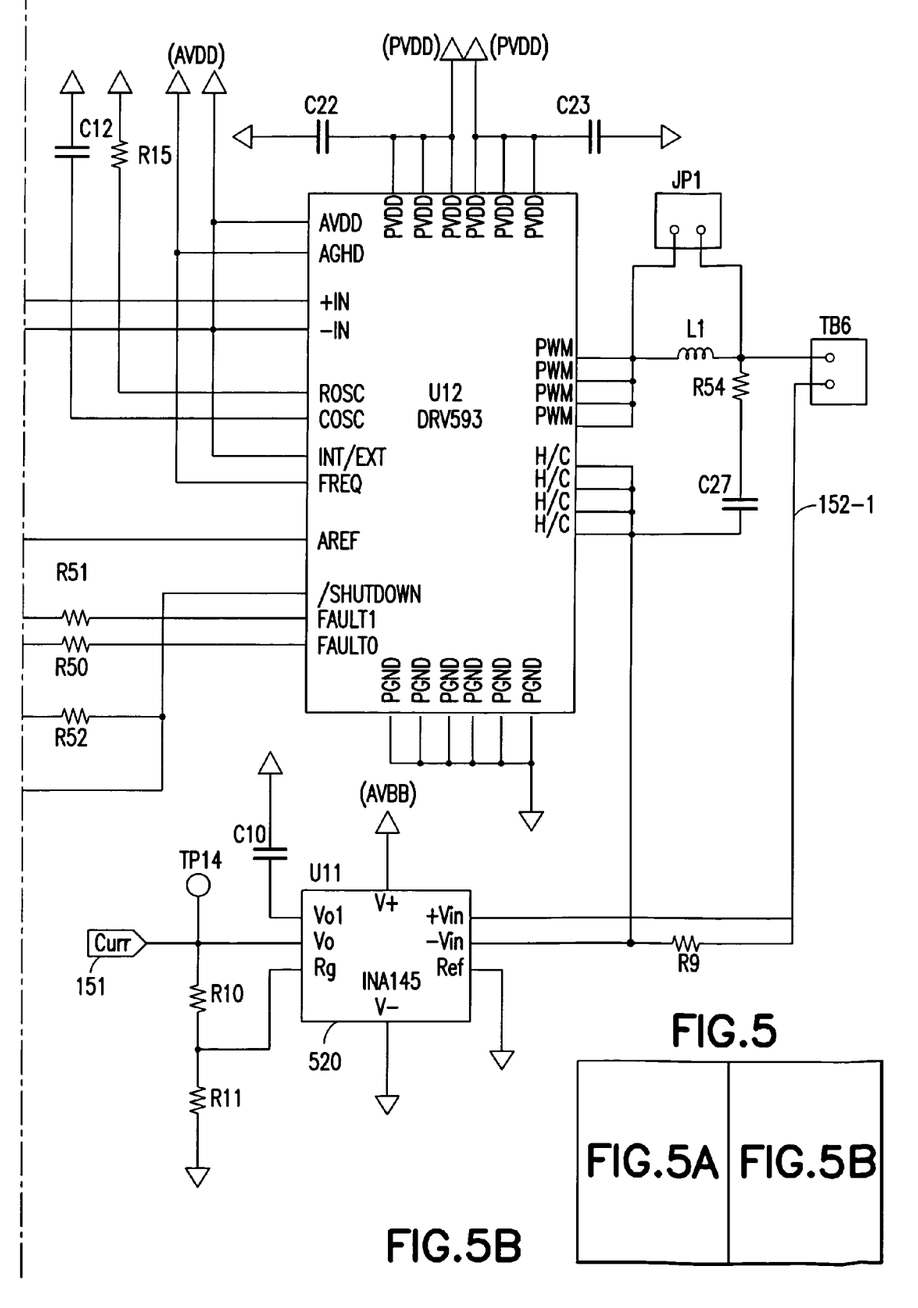
FIG. 5 is a circuit diagram of an exemplary valve controller that provides variable frequency and amplitude dither.
Figure 5A:
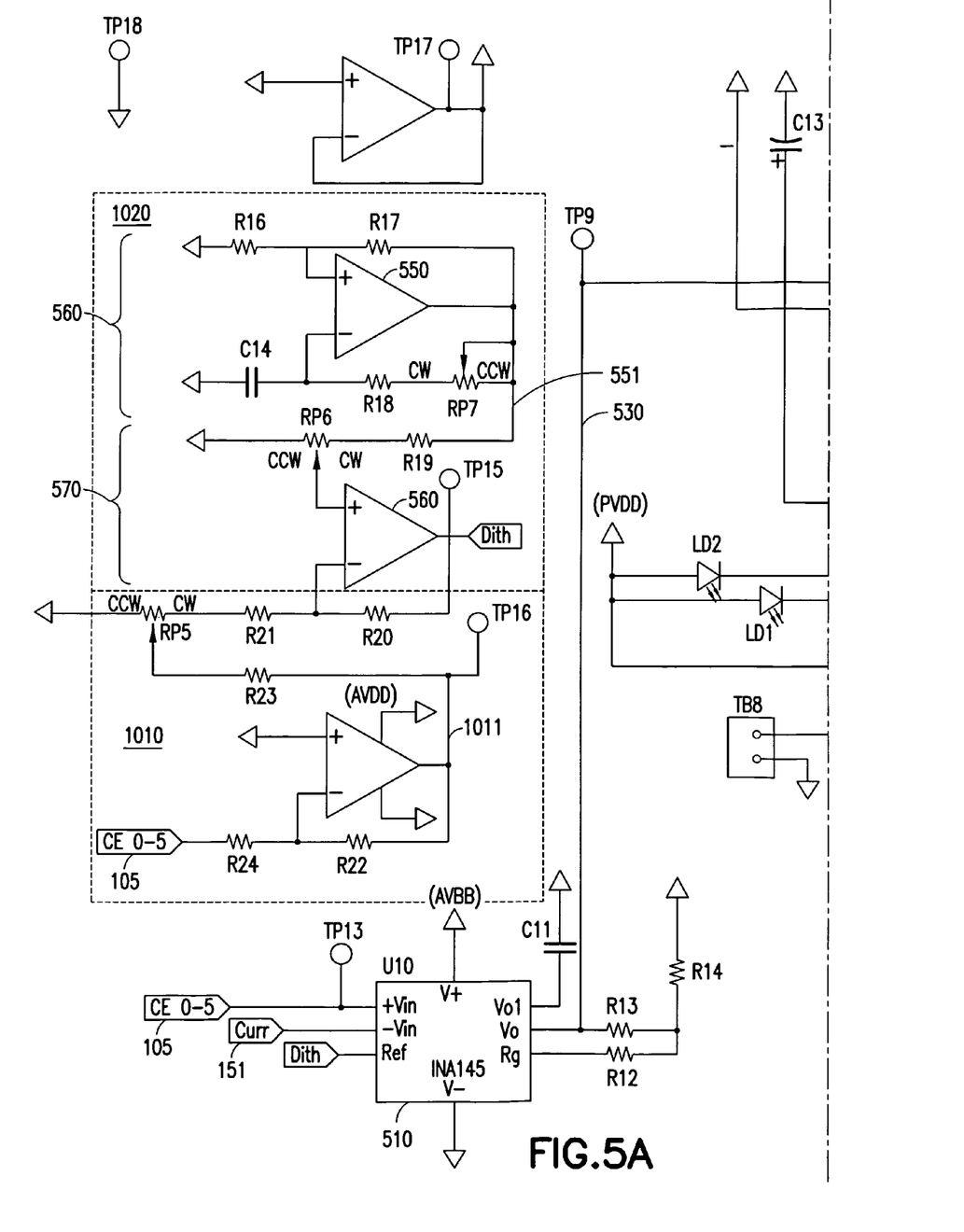
Figures 6, 6B:
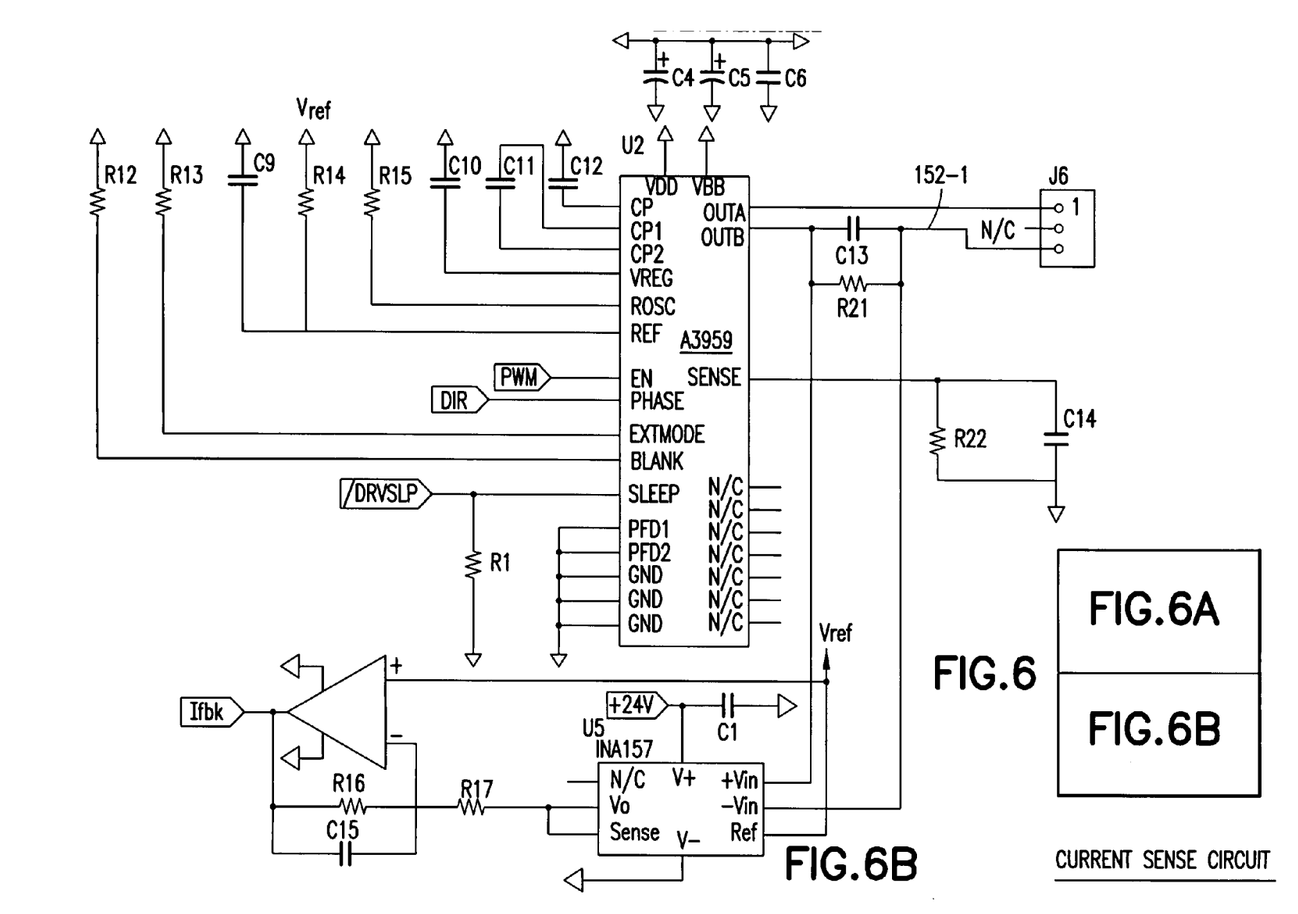
FIG. 6 is a circuit diagram of another exemplary valve controller that provides variable frequency and amplitude dither.
Figure 6A:
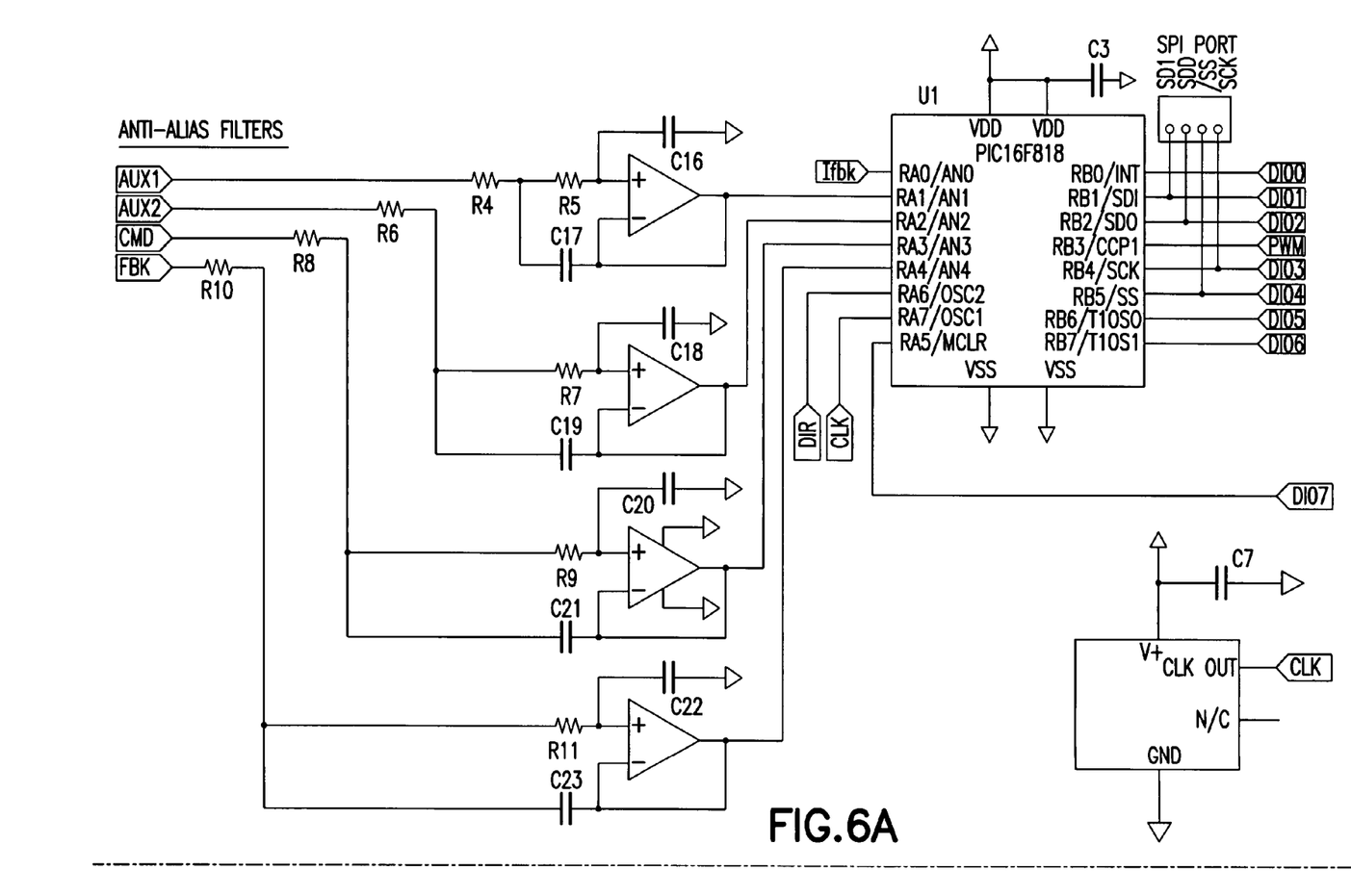
Figure 10:
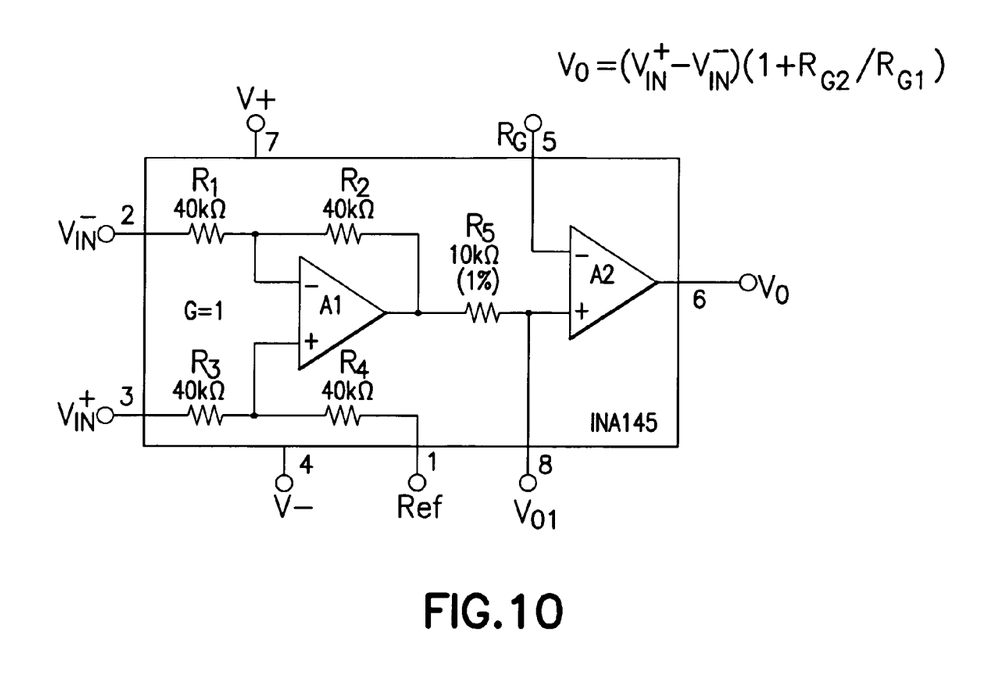
FIG. 10 is a block diagram of an INA145 used in FIG. 5.

Referring to FIGS. 5 and 6, these figures show two different exemplary valve controllers. The circuits shown in FIGS. 5 and 6 correspond to the spool position controller 115, and the feedback sensor module 150 of FIG. 1. The TB6 connection in FIG. 5 and the J6 connection in FIG. 6 are used to carry the control signal(s) 116. The current sense circuit (including an INA145) in FIG. 5 and the current sense circuit (including an INA157) of FIG. 6 are examples of a feedback sensor module 150. The current sense circuit in FIG. 5 uses an INA145 (element 520) to sense voltage across resistor R9 and to determine current flow through the voice coil using the sensed voltage. The INA145 is a device made by a variety of different companies, including Texas Instruments and Burr-Brown and may be constructed from equivalent circuit components. The INA145 is a precision, unity-gain difference amplifier including a precision operational amplifier and an on-chip precision resistor network. A schematic of an exemplary INA145 (from Burr-Brown) is shown in FIG. 10. Two external resistors (e.g., R10 and R11 for 510) are used to set the gain from 1V/V to 1000V/V. The input common-mode voltage range extends beyond the positive and negative rails. The current sense circuit in FIG. 6 uses an INA157 to sense voltage across resistor R21 and to determine current flow through the voice coil using the sensed voltage.

Block 1020 (e.g., dither module 170 of FIG. 1) of FIG. 5 shows exemplary circuitry for providing both amplitude control of dither and frequency control of dither. The block 1010 includes two circuits, a multi-vibrator circuit 560, and an amplitude modification circuit 570. The multi-vibrator circuit 560 includes the resistors R16, R17, R18, the rheostat RP7, the operational amplifier 550, and the capacitor C14. The amplitude modification circuit 570 includes rheostat RP6, resistors R19, R20 and operational amplifier 560. The amplitude modification circuit 570 may also include resistors R21 and rheostat RP5 or fixed resistors of appropriate value.

The rheostat RP7 controls the frequency at which electronic dither occurs, because the capacitor C14, resistor R18, and the rheostat RP7 at least partially control a period of oscillation of the output 551 of the operational amplifier 560. The output 551 has thereon a periodic waveform having a frequency defined in part using C14, R18, and the rheostat RP7. The waveform is approximately a square-wave waveform. The output 551 is fed into the amplitude modification circuitry 560, which is used to modify the amplitude of the waveform. As noted above, modifying the frequency at which dither occurs also modifies the amplitude of the valve (e.g., spool 230/380) motion (e.g., mechanical dither).

The rheostat RP6 controls the amplitude of the electronic dither signal. The wiper of the rheostat RP6 is coupled to the non-inverting input of the operational amplifier 550. An exemplary dead band modification circuitry is shown in block 1010 of FIG. 5. The dead band modification circuitry 1010 is part of an exemplary embodiment of a high gain amplifier such that the amplifier saturates away from the zero reference, but is linear near zero. The dead band modification circuitry 1010 and other similar circuitry and techniques are described in U.S. patent application Ser. No. 11/973,276, assigned to the assignee of the disclosed invention and filed contemporaneously herewith.

The control input signal 105 is the "CE 0-5" signal. In this example, the control input signal 105 is modified by the dead band modification circuitry 1010 and the modified signal 1011 is an input to the amplitude modification circuit 570. The control signal input 105 is coupled to the "Dith" signal.

In FIG. 5, the "Dith" signal is input into the INA 145 (element 510). A schematic of an INA145 is shown in FIG. 9. Furthermore, the "Curr" signal is produced by the INA145 (element 520) and is indicative of the current through the voice coil (e.g., spool actuator 125). The "CE 0-5" is the control input 105 and the INA145, element 520, produces an output signal 530 that has electronic dither added to a difference amplification based on the "CE 0-5" and "Curr" signals. The INA145, element 520, can therefore be considered to be modulation circuitry that modulates a difference signal (created using the control input signal, "CE 0-5", and the feedback signal, "Curr") with the electronic dither signal, "Dith". The output signal 530 of the INA145, element 520, is shown as being input to the "+IN" pin to the DRV593. The DRV593 is a high-efficiency, high-current power amplifier that provides a pulse-width modulated output (e.g., output signals 116) to the voice coil (e.g., spool actuator 125) using the connector JP1.

The dither functions may also be implemented digitally, e.g., by a processor and associated memory. Such a digital implementation of dither is performed by the PIC16F818 of FIG. 6, using an example of an algorithm to implement dither that is given below:

```
//The LoopCount keeps track of program loops (approx 10kHz or 10,000
loops per
// second). Several servo loops will be performed and the LoopCount
incremented
// each time. When the LoopCount equals Tau, the ToggleBit will toggle
and change
// the output from positive DitherAmp to negative DitherAmp.
// This resultant DitherSignal is summed to the output.
//Begin
START:
//***************************
//Enter other servo loop code here
//***************************
    Tau=LoopRate/DitherFrequency;
    If (LoopCount>=Tau)
    {
        ToggleBit=!ToggleBit;
        LoopCount=0;
    }
    DitherSignal=DitherAmp*(1-2*ToggleBit);
    Output+=Dither Signal;
    LoopCount++;
GOTO START;
```

In terms of FIG. 6, electronic dither is added by the PIC16F818 (e.g., a dither module 170 implemented in the PIC16F818) to create the PWM (pulse-width modulation) signal. The "CMD" signal is the control input 105, and the "Ifbk" signal is the feedback signal 151. The PIC16F818 adds the electronic dither to a combination of the "CMD" signal and the "Ifbk" signal to create the "PWM" signal. The "PWM" signal is sent to the A3959, which is an integrated circuit designed for pulse-width modulated (PWM) current control of DC (direct current) motors and which provides the "OUTA" and "OUTB" signals (e.g., control signals 116) for control of regulated valve 120.

It is noted that there are a large number of techniques to accomplish adjustable variable frequency and variable amplitude dither. The block 1020 shown in FIG. 5 and the algorithm given above are merely exemplary possible implementations and are not to be limiting.

Figure 7:
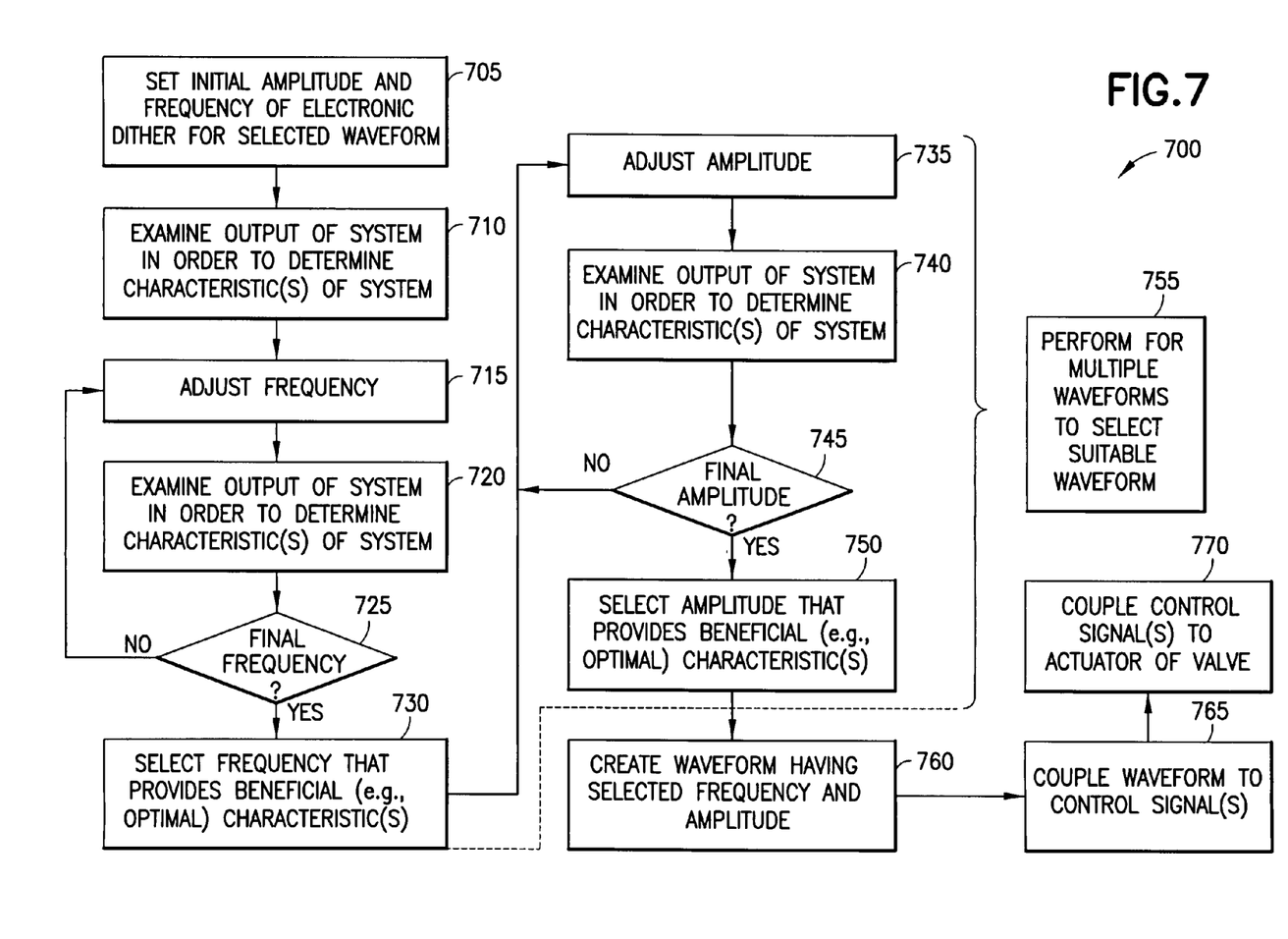
FIG. 7 is a flowchart of an exemplary method for providing variable frequency and amplitude dither for electronically controlled valves and systems using same.

Turning now to FIG. 7, is a flowchart of an exemplary method 700 for providing variable frequency and amplitude dither for electronically controlled valves and systems using same. Method 700 would be performed, e.g., at least in part by a spool position controller 115 or a portion thereof. For instance, in FIG. 8, the method 700 could be performed in an exemplary embodiment at least in part by the dither module 825.

Method 700 is in this example divided into two "stages". Blocks 705-755 correspond to a testing stage, where suitable frequency and amplitude of electronic dither are selected. Additionally, a periodic waveform (e.g., sinusoidal, square, or triangular waveforms) may also be selected. Although the testing stage is not necessary, testing will help select appropriate criteria for a particular mechanical system such as system 100 of FIG. 1. The testing stage usually requires user interaction with a system 100.

Blocks 760-770 are an operational stage, where the selected frequency, amplitude, and periodic waveform of electronic dither are used to cause mechanical dither of a moveable element in a valve. The operational stage typically does not involve user interaction with the system 100.

Method 700 begins in block 705, where an initial amplitude and frequency of electronic dither are selected, typically by a user. Usually, a minimum frequency and amplitude would be selected in block 705, although it is also possible to perform other selections. For example, maximum frequency and amplitude could be selected. In another example, a frequency and amplitude near a previously used frequency and amplitude for a similar system might be selected. It is noted that a periodic waveform (usually, a sinusoidal waveform) would also be selected.

Figure 8:
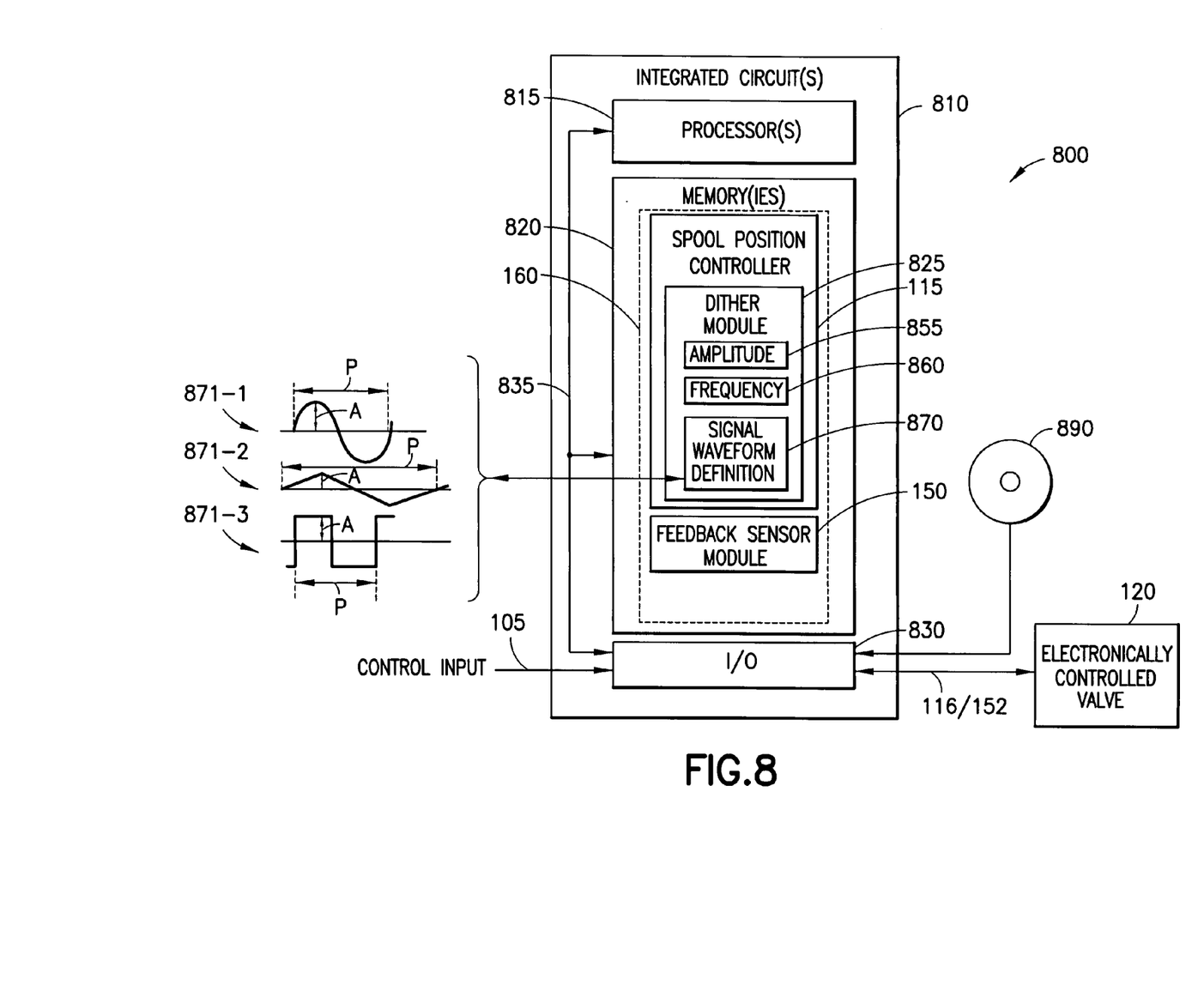
FIG. 8 is a simplified block diagram of a system that includes an exemplary valve controller that provides variable frequency and amplitude electronic dither.

Selection of amplitude and frequency could include setting values for these parameters using a system as shown in FIG. 6 (also see FIG. 8). As another example, modification of amplitude and frequency could include adjustment of rheostats or other configurable devices, as shown in FIG. 5. It is noted that with circuitry such as that shown in FIG. 5, there is typically a range of frequency or amplitude that can be controlled using configurable devices such as rheostats. For instance, adjusting rheostat RP6 from a minimum resistance to a maximum resistance will adjust amplitude from a minimum amplitude to a maximum amplitude, respectively. Any technique for adjusting a parameter such as frequency or amplitude may be used.

In block 710, the output of the system is examined in order to determine one or more characteristics of the system. For instance, output could be determined using the feedback sensor module 150, which can monitor any number of items associated with system output, including the spool actuator 120 (e.g., current through the spool actuator), the position of the spool 130, or any number of other valve attributes (e.g., pressure or flow rate of the fluid 141), as non-limiting examples. The output could be monitored to determine if too much mechanical dither (a characteristic) occurs, such as might occur if the frequency of the mechanical dither were to approach 1 radian/second as shown in FIG. 4. As another example, response (a characteristic) to a change in control input 105 (or a facsimile of the control input 105 produced by the spool position controller 115) could be determined. Such a response could be used to determine the extent of stiction that is occurring. Such a change in control input 105 could be, e.g., a step change or linear ramp. Any way of characterizing an output of a system can be used in order to determine a characteristic, which is then used for comparison.

In block 715, the frequency of electronic dither is adjusted. In block 720, the output of the system is again examined in order to determine the one or more characteristics of the system. In block 725, it is determined if a final frequency has been reached. For instance, if a rheostat has been moved from its minimum resistance to its maximum resistance (or vice versa) or if a maximum value of frequency has been reached. If not (block 725=NO), the method 700 continues in block 715. Thus, blocks 715-725 allow a range of frequencies to be used.

If the final frequency has been reached (block 730=YES), a frequency that provides beneficial characteristic(s) is chosen in block 730. It is noted that in certain situations that an "optimal" frequency might be chosen. If, for example, a certain frequency causes a fastest response to a step change in control input 105, then this frequency could be chosen. However, it may typically be the case that there is some range of frequencies in which characteristics of the system do not change that much. Some frequency within this range could be chosen in block 730.

As noted above with respect to FIG. 4, adjusting the frequency of electronic dither may also affect the amplitude of mechanical dither. It is therefore beneficial to control both frequency and amplitude of electronic dither. Blocks 735-745 allow suitable selection of amplitude of electronic dither.

In block 735, the amplitude is adjusted to a different value from an initial value. The output of the system is examined again in block 740 in order to determine one or more characteristics of the system. Typically, the same characteristics as determined in blocks 710 and 720 would be determined in block 740, but perhaps different characteristics could be determined in block 740, if desired and suitable for the implementation. In block 745, it is determined if the final amplitude has been reached, such as determining whether a rheostat has reached its final resistance or the value of amplitude has reached a maximum programmed value. If the final amplitude has not been reached (block 745=NO), the method 700 continues in block 735.

If the final amplitude has been reached (block 745=YES), the method continues in block 750, where the amplitude is selected that provides a beneficial output. Block 750 may entail selecting an "optimal" amplitude, if such an amplitude exists. However, it could be that a range of amplitudes of electronic dither will provide similar characteristics and therefore any amplitude in the range could be selected in block 750.

The "optimal" amplitude and frequency will depend on the needs of the electro-mechanical device. In some situations, a properly tuned dither frequency will exhibit the lowest attainable resolution for the given system. Additionally, the amplitude could be set to a minimum value while still ensuring stiction is not observed. Using this minimum setting will provide power efficiency and noise control, but a setting higher than this minimum may also be acceptable.

It is noted that blocks 735-750 could be performed prior to blocks 715-730. Method 700 is merely an example. Furthermore, after block 750, blocks 715-730 may be performed again, using a more narrow range of frequencies, in order to provide fine tuning of the frequency and amplitude. Determining amplitude using blocks 735-750 and frequency using blocks 715-730 could be performed multiple times, if desired.

Block 755 allows for multiple waveforms to be compared. In general, sinusoidal waveforms are easy to generate and are typically used. However, square, triangular, or other waveforms may also be used. Block 755 entails performing blocks 705-750 a number of times, each time using a selected waveform of a plurality of waveforms. A suitable waveform, based on the characteristics, is then selected. It may be that characteristics do not change appreciably between multiple waveforms. In that case, any of the waveforms having suitable characteristics can be selected.

It is also noted that it might be possible to provide automatic selection of amplitude, frequency, and waveform. For instance, a suitable system 100 might be controlled to perform blocks 705-750 (and 755, if desired) in order to determine suitable amplitude, frequency, and waveform. However, a circuit as shown in FIG. 5 might not be suitable for automatic selection, unless the rheostats RP6 and RP7 are replaced by electronically controlled elements such as digitally controlled potentiometers.

In block 760, a selected waveform is created having the selected frequency and amplitude. In block 765, the waveform is coupled to the control signal(s). A result of block 765 is that the control signal(s) are modified by the waveform. Such coupling includes modulation (as shown in FIG. 5, where the INA145, element 510, uses the "Dith" signal to modulate a difference signal created using the control input signal, "CE 0-5", and the feedback signal 151, "Curr"), an adder, a multiplier, a transformer or non-linear coupling components. The output control signal(s) 116 are coupled to the actuator 125 of the regulated valve 120 in block 770. Note that block 770 may also include further modification of the control signal(s) 116, such as shown in FIG. 5, where the signal 530, which has electronic dither added to the signal, is further modified by the DRV593 into a PWM signal. Similarly, in FIG. 6, the signal "PWM", which has electronic dither added to it by the PIC16F818, is further modified by the A3959 into a PWM signal.

Turning now to FIG. 8, this figure shows a simplified block diagram of a system 800 that includes an exemplary valve controller 160 that provides variable frequency and amplitude electronic dither. The system 800 includes one or more integrated circuits 810 and an electronically controlled valve 120. A digital versatile disk (DVD) 890 is also shown.

The integrated circuits include one or more processors 815, one or more memories 820, and input/output (I/O) modules 830, each interconnected through one or more buses 835. The one or more memories include the valve controller 160, which includes a spool position controller 115 and a feedback sensor module 150. The spool position controller 115 includes dither module 825 (e.g., dither module 170 of FIG. 1). In this example, the dither module 825 includes a programmed amplitude 855, a programmed frequency 860, and a signal waveform definition 870. The signal waveform definition 870 defines the type of waveform 871, such as sinusoidal waveform 871-1, triangular waveform 871-2, or square-wave waveform 871-3. The programmed amplitude 855 adjusts the amplitude ("A") of a waveform 871 defined by the signal waveform definition 870, while the frequency 860 defines the period ("P") of the waveform 871 (and therefore defines the frequency of the waveform 871).

Embodiments of the disclosed invention may be implemented as a computer program product including program instructions embodied on a tangible computer-readable medium, execution of the program instructions resulting in operations described herein. The computer-readable medium can be, e.g., the memory(ies) 820, a digital versatile disk (DVD) 890, a compact disk (CD), a memory stick, or other long or short term memory.

Certain embodiments of the disclosed invention may be implemented by hardware (e.g., one or more processors, discrete devices, programmable logic devices, large scale integrated circuits, or some combination of these), software (e.g., firmware, a program of executable instructions, microcode, or some combination of these), or some combination thereof. As shown above, aspects of the disclosed invention may also be implemented on one or more integrated circuits, comprising hardware and perhaps software residing in one or more memories.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A method comprising:
   for each of a plurality of potential frequencies for a testing periodic waveform, adjusting, by a processor, a frequency of the testing periodic waveform to be the potential frequency and determining an associated extent of stiction of an electronically controlled device based on an output of the device when the adjusted testing periodic waveform is used;
   selecting, by the processor, one of the plurality of potential frequencies as a selected frequency based at least in part on the associated extent of stiction;
   for each of a plurality of potential amplitudes for the testing periodic waveform, adjusting, by the processor, the amplitude of the testing periodic waveform to be the potential amplitude and determining an associated extent of stiction of the electronically controlled device based on an output of the device when the adjusted testing periodic waveform is used;
   selecting, by the processor, one of the plurality of potential amplitudes as a selected amplitude based at least in part on the associated extent of stiction;
   creating an operational periodic waveform having the selected frequency and the selected amplitude;
   coupling the operational periodic waveform to at least one control signal to generate a modified control signal; and
   providing the modified control signal to an output circuit that is coupled to an actuator of the electronically controlled device.

2. The method of claim 1, where a type of the testing periodic waveform is one of a sinusoidal waveform, a square-wave waveform, and a triangular waveform.

3. The method of claim 1, further comprising allowing a type of the testing periodic waveform to be selected from a plurality of types of periodic waveforms.

4. The method of claim 3, wherein the plurality of types of the periodic waveforms comprises a sinusoidal waveform, a square-wave waveform, and a triangular waveform.

5. An apparatus comprising:
   electronic dither circuitry configured to create a periodic waveform having a frequency and amplitude, wherein the electronic dither circuitry is further configured to allow both the frequency and the amplitude to be adjusted;
   coupling circuitry configured to couple the periodic waveform to at least one control signal to generate a modified control signal;
   feedback sensor circuitry configured to determine an output of an electronically controlled device;
   at least one processor; and
   at least one computer-readable medium storing program instructions, execution of the program instructions causing the apparatus to perform at least the following:
     for each of a plurality of potential frequencies for a given periodic waveform, adjusting a frequency of the given periodic waveform to be the potential frequency and determining an associated extent of stiction of the electronically controlled device based on the output of the device when the adjusted periodic waveform is used,
     selecting one of the plurality of potential frequencies as a selected frequency based at least in part on the associated extent of stiction,
     for each of a plurality of potential amplitudes for the given periodic waveform, adjusting the amplitude of the given periodic waveform to be the potential amplitude and determining an associated extent of stiction of the electronically controlled device based on the output of the device when the adjusted periodic waveform is used, and
     selecting one of the plurality of potential amplitudes as a selected amplitude based at least in part on the associated extent of stiction; and
   output circuitry configured to couple the modified control signal to an actuator of the electronically controlled device.

6. The apparatus of claim 5, further comprising the electronically controlled device.

7. The apparatus of claim 5, wherein the electronically controlled device further comprises a valve body having a fluid inlet and a fluid outlet, and a spool having a plurality of longitudinally spaced apart lands disposed within said valve body configured to valve said fluid inlet and outlet.

8. The apparatus of claim 5, wherein the coupling circuitry comprises one of an adder, a multiplier, or a modulator.

9. The apparatus of claim 5, wherein the electronic dither circuitry comprises:
   a multi-vibrator circuit configured to produce the waveform at the selected frequency; and
   an amplitude modification circuit configured to modify the waveform to have the selected amplitude.

10. The apparatus of claim 5, wherein the electronic dither circuitry is further configured to allow selection of a type of the periodic waveform from a plurality of types of periodic waveforms.

11. The apparatus of claim 10, wherein the plurality of types of the periodic waveforms comprises a sinusoidal waveform, a square-wave waveform, and a triangular waveform.

12. The apparatus of claim 5, wherein at least the electronic dither circuitry comprises one or more integrated circuits.

13. The apparatus of claim 5, wherein the at least one processor and the at least one computer-readable medium are embodied in one or more integrated circuits.

14. A non-transitory computer program product comprising program instructions embodied on a tangible computer-readable medium, execution of the program instructions resulting in operations comprising:
- for each of a plurality of potential frequencies for a testing periodic waveform, adjusting a frequency of the testing periodic waveform to be the potential frequency and determining an associated extent of stiction of an electronically controlled device based on an output of the device when the adjusted testing periodic waveform is used;
- selecting one of the plurality of potential frequencies as a selected frequency based at least in part on the associated extent of stiction;
- for each of a plurality of potential amplitudes for the testing periodic waveform, adjusting an amplitude of the testing periodic waveform to be the potential amplitude and determining an associated extent of stiction of the electronically controlled device based on the output of the device when the adjusted testing periodic waveform is used;
- selecting one of the plurality of potential amplitudes as a selected amplitude based at least in part on the associated extent of stiction;
- creating an operational periodic waveform having the selected frequency and the selected amplitude;
- coupling the operational periodic waveform to at least one control signal to generate a modified control signal; and
- providing the modified control signal to an output circuit that is coupled to an actuator of the electronically controlled device.

15. The computer program product of claim 14, where a type of the testing periodic waveforms is one of a sinusoidal waveform, a square-wave waveform, and a triangular waveform.

16. The computer program product of claim 14, further comprising allowing a type of the testing periodic waveform to be selected from a plurality of types of periodic waveforms.

17. The computer program product of claim 16, wherein the plurality of types of the periodic waveforms comprises a sinusoidal waveform, a square-wave waveform, and a triangular waveform.

18. The method of claim 1, wherein selecting one of the plurality of potential amplitudes as the selected amplitude comprises determining a subset of potential amplitudes of the plurality of potential amplitudes that generates a minimum associated extent of stiction and selecting a minimum potential amplitude from the subset of potential amplitudes as the selected amplitude.

19. The apparatus of claim 5, wherein selecting one of the plurality of potential amplitudes as the selected amplitude comprises determining a subset of potential amplitudes of the plurality of potential amplitudes that generates a minimum associated extent of stiction and selecting a minimum potential amplitude from the subset of potential amplitudes as the selected amplitude.

20. The computer program product of claim 14, wherein selecting one of the plurality of potential amplitudes as the selected amplitude comprises determining a subset of potential amplitudes of the plurality of potential amplitudes that generates a minimum associated extent of stiction and selecting a minimum potential amplitude from the subset of potential amplitudes as the selected amplitude.

* * * * *